US012705381B2

(12) United States Patent
Friedman et al.

(10) Patent No.: US 12,705,381 B2
(45) Date of Patent: Aug. 11, 2026

(54) SMART RESULT FILTRATION FOR SECRET SCANNING

(71) Applicant: MICROSOFT TECHNOLOGY LICENSING, LLC, Redmond, WA (US)

(72) Inventors: Tamir Friedman, Tel Aviv (IL); Idan Hen, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 54 days.

(21) Appl. No.: 18/619,051

(22) Filed: Mar. 27, 2024

(65) Prior Publication Data

US 2025/0307444 A1 Oct. 2, 2025

(51) Int. Cl.
*G06F 21/62* (2013.01)
*G06N 5/04* (2023.01)

(52) U.S. Cl.
CPC ........... *G06F 21/6218* (2013.01); *G06N 5/04* (2013.01)

(58) Field of Classification Search
CPC ...... G06F 21/6218; G06F 21/577; G06N 5/04
See application file for complete search history.

(56) References Cited

U.S. PATENT DOCUMENTS 5,511,192 A * 4/1996 Shirakihara ............ G06F 9/468 718/106
8,176,563 B2 * 5/2012 Redlich .............. G06F 21/6209 715/255
9,514,326 B1 * 12/2016 Kroeger ................ G06F 16/113
10,038,727 B1 * 7/2018 Hodge .................. H04L 63/306
10,121,021 B1 * 11/2018 Fonseka .............. G06F 21/6218
10,523,643 B1 * 12/2019 Davis ...................... H04L 63/20
10,902,344 B1 * 1/2021 Kenthapadi ............ G06N 20/00
10,949,568 B1 * 3/2021 Peake, III ........... G06F 21/6254
11,606,339 B1 * 3/2023 Kotas .................. H04L 63/0414
11,714,967 B1 * 8/2023 Wu .................... G06Q 50/2053 704/9
11,983,777 B1 * 5/2024 Metzger ................. G06Q 40/08

(Continued)

FOREIGN PATENT DOCUMENTS

AU 2022307535 A1 1/2024

OTHER PUBLICATIONS

International Search Report and Written Opinion received for PCT Application No. PCT/US2025/014391, mailed on May 7, 2025, 13 pages.

*Primary Examiner* — Aravind K Moorthy
(74) *Attorney, Agent, or Firm* — David Foster; Newport IP, LLC

(57) ABSTRACT

The disclosed techniques for secret scanning in cloud environments significantly enhance detection quality and efficiency by employing a multivariate collaborative filtering model. This model intelligently filters out irrelevant secrets identified across customer environments by analyzing a variety of features including secret type, secret value, file path, and other metadata. A relevance score is assigned to each secret based on its similarity to secrets detected in other customers. This approach intelligently filters out irrelevant secrets, reducing the noise and focusing on genuine security risks, thereby enhancing the efficiency and efficacy of secret scanning in cloud environments. The disclosed filtration process also adapts to evolving cloud environments.

20 Claims, 5 Drawing Sheets

(56) References Cited

U.S. PATENT DOCUMENTS

2003/0154386 A1* 8/2003 Wittkotter .......... G06F 21/6218 713/193
2003/0194085 A1* 10/2003 Dillaway .......... G06F 21/6209 380/29
2005/0055565 A1* 3/2005 Fournet .......... G06F 21/577 726/26
2008/0276058 A1* 11/2008 Mosek .......... G06F 12/1441 711/163
2008/0320590 A1* 12/2008 Craft .......... G06F 21/6218 726/21
2009/0292784 A1* 11/2009 Leedberg .......... H04L 51/212 709/206
2013/0086691 A1* 4/2013 Fielder .......... H04L 63/061 726/26
2013/0185555 A1* 7/2013 Wang .......... G06F 3/065 713/165
2014/0282814 A1* 9/2014 Barney .......... G06F 21/554 726/1
2017/0286700 A1* 10/2017 Sartor .......... H04L 63/0823
2017/0366510 A1* 12/2017 Abebe .......... G06N 20/00
2018/0295194 A1* 10/2018 Deraz .......... H04L 67/51
2019/0109701 A1* 4/2019 Paz de Araujo .......... H04L 9/0891
2019/0146816 A1* 5/2019 Reno .......... G06F 21/10 718/1
2019/0347334 A1* 11/2019 Sundaramoorthy .......... G06F 21/6218
2020/0125775 A1* 4/2020 Nagpal .......... G06F 21/88
2020/0389295 A1* 12/2020 Almeida .......... H04L 9/0897
2021/0006402 A1* 1/2021 Ohms .......... H04L 9/0643
2021/0051294 A1* 2/2021 Roedel .......... G06F 21/6245
2021/0286895 A1* 9/2021 Yang .......... G06F 21/563
2021/0294585 A1* 9/2021 Lee .......... G06N 3/105
2021/0350001 A1 11/2021 Alturaifi
2021/0365816 A1 11/2021 Sears
2022/0027505 A1* 1/2022 Liu .......... G06F 16/90344
2022/0103533 A1* 3/2022 Srinivasan .......... H04L 63/02
2022/0108028 A1* 4/2022 Gorog .......... H04L 9/0827
2022/0188452 A1* 6/2022 Song .......... G06F 16/5846
2022/0245477 A1* 8/2022 Eshghi .......... G06N 5/04
2022/0261487 A1* 8/2022 Lounsberry .......... G06F 21/6209
2022/0345457 A1* 10/2022 Jeffords .......... G06F 21/6218
2022/0365777 A1* 11/2022 Makmel .......... G06F 8/73
2022/0405062 A1* 12/2022 Karri .......... G06F 11/3698
2023/0055285 A1* 2/2023 Nicholson .......... G06F 21/6209
2023/0063214 A1* 3/2023 Tischler .......... G06F 16/285
2023/0088524 A1* 3/2023 Greer .......... G06F 21/577 726/25
2023/0109730 A1 4/2023 Gil
2023/0325527 A1* 10/2023 Yarabolu .......... G06F 18/2185 726/26
2023/0344852 A1* 10/2023 Sirhani .......... G06Q 10/0639
2023/0359714 A1* 11/2023 Cristache .......... B25J 11/0005
2023/0401213 A1* 12/2023 Shrivatsa Bhargav .......... G06F 16/9024
2023/0401458 A1* 12/2023 Ross .......... G06F 40/279
2023/0409315 A1* 12/2023 Carleton, Jr. .......... G06F 8/71
2024/0073223 A1* 2/2024 Weizman .......... H04L 12/4675
2024/0111893 A1* 4/2024 Shelton, IV .......... G06F 21/604
2024/0127008 A1* 4/2024 Pabolu .......... G06F 40/58
2024/0135239 A1* 4/2024 Dhurandhar .......... G06N 5/04
2024/0144661 A1* 5/2024 Hazeyama .......... G06F 18/2433
2024/0146755 A1* 5/2024 Ungureanu .......... H04L 41/145
2024/0220851 A1* 7/2024 Rodriguez .......... G06N 20/00
2024/0223543 A1* 7/2024 Miedema .......... H04L 63/0428
2024/0248982 A1* 7/2024 Ezrielev .......... G06N 20/00
2024/0333498 A1* 10/2024 Sabin .......... H04L 9/0894
2024/0354348 A1* 10/2024 Ascoli .......... G06F 16/908
2024/0362351 A1* 10/2024 Brown .......... G06F 21/6218
2024/0362421 A1* 10/2024 Markov .......... G06F 40/216
2024/0411906 A1* 12/2024 White .......... G06N 20/00
2025/0005491 A1* 1/2025 Goodwin .......... G06Q 10/0635
2025/0080329 A1* 3/2025 Bruno .......... H04L 9/14
2025/0214605 A1* 7/2025 Langefeld .......... H04L 67/12
2025/0225386 A1* 7/2025 Binkley .......... G06N 3/08
2025/0307444 A1* 10/2025 Friedman .......... G06F 21/577

* cited by examiner

Secret Value 212
Secret Offset 214
Secret Type 216
File Name 218
File Path 220
File Size 222
File Contents 224
File Metadata 226
Features 210
Feature Preprocessing Engine 230
Training Relevance Score 240
Secret Prioritization Model 250
Relevance Score 260
Relevance Explanation 270

SMART RESULT FILTRATION FOR SECRET SCANNING

BACKGROUND

In the evolving landscape of cloud computing, secret scanning tools have become indispensable for identifying potential security vulnerabilities. Secret scanning tools detect secrets such as private keys, passwords, tokens, and certificates within customer environments. Traditional scanning techniques, employing methods like disk, storage, and code repository scans, have been designed to cast a wide net, aiming to uncover any and all secrets that could potentially compromise security. However, these tools often lack the precision needed to distinguish between secrets that pose a real threat to the customer's assets and those that are benign or irrelevant. This deficiency leads to a high volume of false positives-detections of secrets that, while technically present, do not actually represent a risk to the customer. Such irrelevant detections primarily include secrets used internally by third-party software or services, which are outside the customer's purview and control, and thus, do not impact their security posture.

It is with respect to these and other considerations that the disclosure made herein is presented.

SUMMARY

The disclosed techniques for secret scanning in cloud environments significantly enhance detection quality and efficiency by employing a multivariate collaborative filtering model. This model intelligently filters out irrelevant secrets identified across customer environments by analyzing a variety of features including secret type, secret value, file path, and other metadata. A relevance score is assigned to each secret based on its similarity to secrets detected in other customers. This approach intelligently filters out irrelevant secrets, reducing the noise and focusing on genuine security risks, thereby enhancing the efficiency and efficacy of secret scanning in cloud environments. The disclosed filtration process also adapts to evolving cloud environments, offering a scalable, generic solution that improves customer satisfaction and reduces incident rates.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
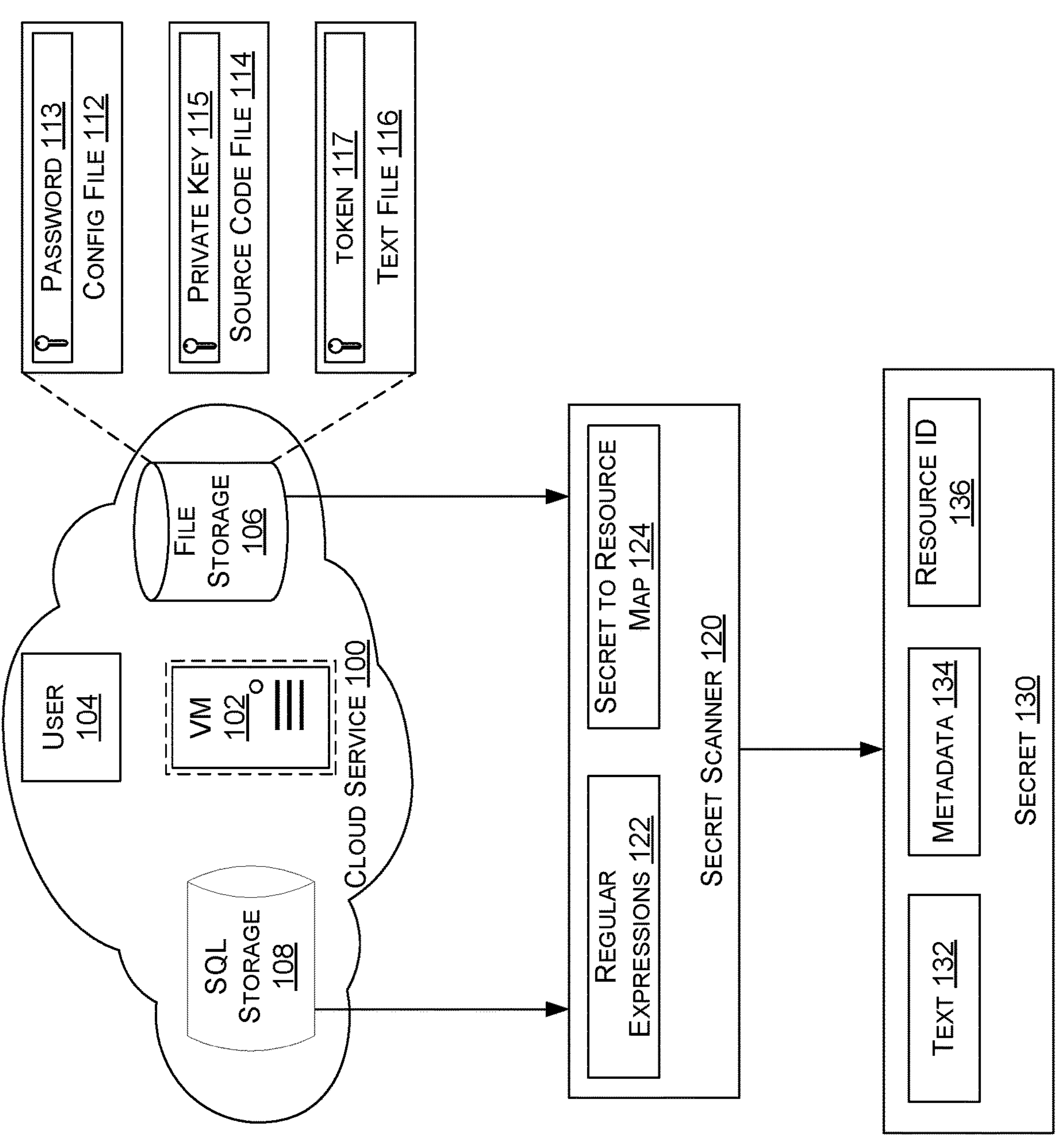
FIG. 1 illustrates identifying secrets within cloud-based storage.

Secret scanning is a cybersecurity practice aimed at detecting and preventing unauthorized access to confidential information such as passwords, API keys, and private tokens within a codebase or data storage environment. This technique involves automated tools that systematically scan code repositories, databases, files, and other storage locations for patterns that match the formats of secret keys and credentials. Upon identification, secret scanning tools alert administrators or automatically take action to secure the exposed secrets, minimizing the risk of data breaches or unauthorized system access.

Cloud platforms often host vast amounts of data and are accessible over the internet, and so they present attractive targets for cyber attackers. Some secret scanning tools systematically search through files hosted in the cloud. Snapshots of entire file systems may be scanned at once. While cloud-based files are typically associated with particular users, secret scanning is often performed in an agentless manner—i.e., without being logged in as a particular user. Regular expressions may be used to search each file for secrets, but other pattern recognition techniques such as parsers and machine learning models are similarly contemplated.

In some configurations a secret refers to a password, a private key, a token, or some other item that grants access to a cloud resource. For example, the SSH protocol is used to authenticate a remote user. One type of secret employed by SSH is a password of a username and password. Another secret employed by SSH is a private key of a public-private key pair. In both cases, the secrets grant remote access to a virtual machine. It is often difficult to determine where these secrets are, how they may be exposed, and what cloud resources their compromise puts at risk.

Secrets such as SSH credentials are often left stored on a cloud drive by mistake. Hackers that have gained access to one cloud resource are quick to scan the cloud drive for secrets that could be used to further the attack, leading to a potential cascade of exploited vulnerabilities. Secret scanning provides visibility to these secrets. It also provides understanding for each secret that was detected, such as which resource may be compromised by that secret. Continuing the SSH example, secret scanning may identify which virtual machine can be accessed using a private key.

Another aspect of secret scanning is prioritizing secrets found and creating recommendations for curing the vulnerability. For example, the user may be recommended to delete a file containing a secret, encrypt the file, use an alternative technique for accessing the resource protected by the secret, etc. Remediation may also entail identifying and contacting the person responsible for leaving the secret exposed.

Remediation is not always as simple as deleting or encrypting the secret-care must be taken to prevent the cure from being worse than the disease. For example, if the secret is found in a configuration file on a virtual machine, deleting the configuration file may cause an adverse impact such as breaking the functionality of a cloud-hosted application. Other types of remediation that have a reduced impact on the application include storing the secret in a key vault or encrypting the file containing the secret.

Secret scanning may scan any type of file or disk region, relational database tables, no-SQL tables, blob storage entries, source code repositories, in-memory data caches, or any other type of data storage. Secret scanning may also be applied to data as it is transferred over a network, loaded into memory, or otherwise moved. Secret scanning may be applied to text files, source code files, configuration files, word processing documents, and binary files. In some configurations, secret scanning may be applied to screenshots, videos, or other image data, e.g. by performing OCR on image data and analyzing the resulting text.

One motivation for the disclosed embodiments is the large number of matches found by existing secret scanning techniques. For example, a secret scanner that uses regular expressions to identify secrets may return hundreds or even thousands of matches when scanning for secrets. This number of responses can be overwhelming to users. This problem can be particularly acute when the secret scanner also identifies unverified secrets-secrets for which the corresponding resource cannot be identified. For example, a regular expression may identify a private key, but the private key gives access to an environment that is unknown to the user. This scenario often arises when the secret is part of a third party library. There are often a significant number of unverified secrets, and without the ability to determine what resource they enable access to it is difficult to know whether the secret is truly a risk, and if it is, how to ameliorate it.

Another scenario in which a secret is benign occurs when the secret is not associated with any resource at all. For example, sample code may include a private key for demonstration purposes, but which is not associated with an actual resource. Another example of a benign secret is a secret associated with a third party service. The third party service may utilize a secret that is distributed as part of a library, but these secrets do not constitute a security vulnerability for the end user-they are not owned by the user and they do not concern user data—but they do create noise when scanning for secrets. Often a warning about a security vulnerability attributed to a 3rd party service is exaggerated by not being able to modify 3rd party code containing the secret.

Another motivation of the disclosed embodiments is to create a dynamic and flexible system for secret scanning. This is in contrast with existing techniques, which tend to be static and inflexible by relying on predefined rules or patterns that do not account for the dynamic nature of cloud environments or the specific context in which a secret is used. Increased adaptability means that secret scanning tools remain effective as cloud services and security threats evolve.

Once a secret is known to many people it is no longer a secret. In the case of an external secret used by a third party module, the path to the file that contains the secret may be the same for all users. So, in some configurations, secrets that match a regular expression but which are in a common path shared by many users may be de-prioritized or omitted from secret scanning results. Similarly, secrets that are identical and that appear in the same file for multiple users may be de-prioritized or omitted from secret scanning results.

Some secrets have features embedded within themselves. For example, a secret such as a database connection string may have an embedded target resource address, such as an IP address. If the IP address of the corresponding resource is the same across many users then it is more likely to be benign. Similarly, a database connection string may have within it username and password that may be extracted as features.

In some configurations, a machine learning model is trained to identify which secrets are benign and which secrets pose a security vulnerability. The model may be trained on features taken from the context in which the secrets are found, such as the secret itself, a hash of the secret, an offset of the secret within the file, related text that is proximate to the secret within the file, the username, the file path, the filename, file size, etc. The model may also be trained on the type of secret, as different types of secrets have different pieces of metadata that are more or less relevant.

Sometimes a secret will appear in the same file and at the same path but be associated with a different username. False negatives, such as mistakenly de-prioritizing or omitting a secret because it is located in a common location, may be avoided by including user-specific metadata when training the model. For example, Kubernetes may store credentials in a particular file at a particular file path, but because the username is different for each user the secrets are not shared, and so the secrets are identified as in need of protection.

To address these concerns, a machine learning model is trained using the features described above to ascribe relevance scores to secrets. The model may then be used to infer a relevance score for a particular secret based on the metadata of that particular secret. The inferred relevance score indicates how urgent it is that the secret be addressed. This urgency may be based on a probability that the secret could be obtained by a hacker, a probability that a hacker could take control of an associated resource using the secret, a probability that the secret is in fact private to this particular user, etc. For example, the secret receives a higher relevance score when the secret is more likely to be an actual secret—not a value that appears frequently across user accounts. When the relevance score exceeds a threshold the secret may be classified as at risk, triggering an alert to a security analyst or receiving a prominent location in a report of potential security vulnerabilities. A relevance score below this threshold may be deprioritized in search results, while a secret with a relevance score of zero may be omitted from further consideration. Relevance scores may also be used to sort a list of secrets presented to a user for further inspection. In some configurations, the machine learning model architecture utilizes collaborative filtering to differentiate secrets that pose a security risk from benign secrets. Collaborative filtering infers whether a particular secret is a security risk by comparison to secrets identified in other user accounts.

FIG. 1 illustrates identifying unverified secrets within cloud-based storage. Cloud service 100 hosts a number of services, such as virtual machine (VM) 102, file storage 106, and structure query language (SQL) storage 108. User 104 represents a user account that has been authorized to access some or all of these cloud resources. Other types of storage are similarly contemplated, including object storage and block storage. Also, while the techniques discussed herein are primarily in the context of cloud storage, the same or similar techniques may similarly be applied to files on local storage, edge storage, distributed storage, or any other real or virtual storage device.

File storage 106 may store any number and type of files, such as config file 112, source code file 114, and text file 116. File storage 106 may store text-based files, binary files, image files, media files, productivity documents, web pages, and any other type of file, document, or content. File storage 106 may store files for a single user 104 or for multiple user accounts of cloud service 100.

Secret scanner 120 analyzes files stored in file storage 106 to identify secrets-information that can be used to access a cloud resource. Non-limiting examples of secrets illustrated in FIG. 1 include password 113, private key 115, and token 117. Secrets are often left in plain text in a file, leaving them at risk if an attacker gained access to file storage 106.

In some configurations, secret scanner 120 identifies secrets 130 by applying one or more regular expressions 122 to files 112 of file storage 106. However, in other embodiments, other types of text parsing technology may be employed, such as lexers, parsers, discrete finite automata, etc. Regular expressions 122 may look for patterns, such as a string of letters and numbers that is the same length as and character composition as a secret. Regular expressions 122 may also look for context commonly found around a secret, such as an attribute tag or other identifier. For example, a regular expression may look for the identifier "password=", capturing the text that follows as a password. In some configurations, a snapshot of file storage 106 is obtained in order to perform secret scanning.

Secret scanner 120 may operate outside the context of a particular user when scanning the files of file storage 106. At the same time, usernames and other user identifiers may be obtained to be provided as metadata 134 of secret 130. Accordingly, regular expressions 122 may also extract user identifiers such as usernames, user tokens, etc. from file 112.

Some of the secrets identified by secret scanner 120 contain or are proximate to an indication of which cloud resource it controls access to. Resource ID 136 identifies which cloud resource is controlled by secret 130. When a corresponding cloud resource is not evident from the secret itself or the surrounding context, secrets identified by secret scanner 120 may be associated with the corresponding cloud resource by utilizing secret to resource map 124. Secret to resource map 124 may store associations between private keys, certificates, tokens, and identifiers of the resources they control access to. In this scenario, secret scanner 120 may use secret to resource map 124 to look up resource ID 136 based on the text 132 of secret 130. In some configurations, secret to resource map 124 represents a live index of cloud resources that secret 130 may provide access to.

Metadata 134 represents any additional information about secret 130. Metadata 134 may include file name, the path to the file, file size, the file creator, file creation and modification date, or other information about the file 112 that secret 130 was found in. Metadata 134 may also include information about secret 130, such as secret type, the offset of the secret within file 112, etc. Metadata 134 is discussed in more detail below in conjunction with FIG. 2.

Figure 2:
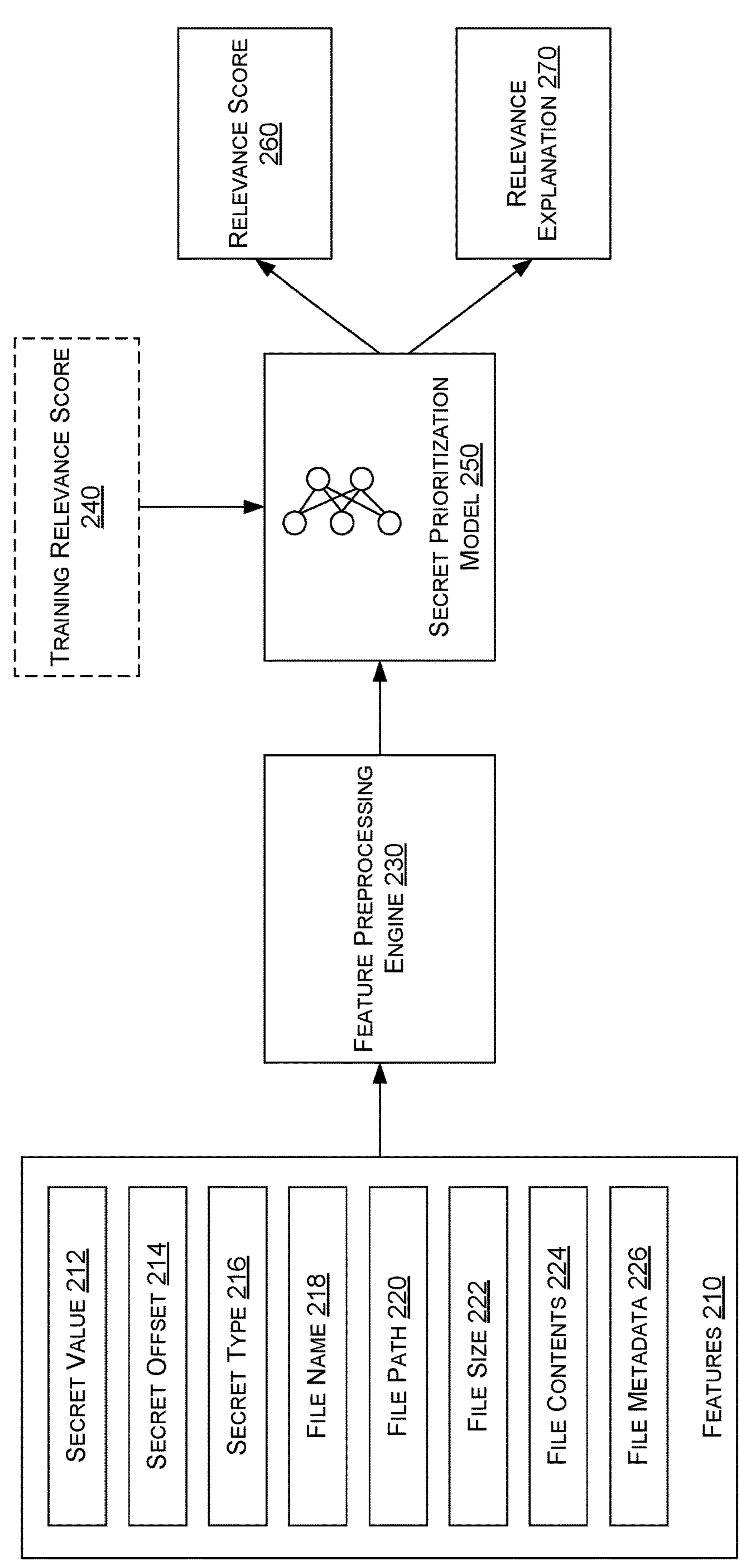
FIG. 2 illustrates computing a relevance score of a secret.

FIG. 2 illustrates computing a relevance score of a secret. Features 210 are obtained from secret 130, including metadata 134, and are used to infer relevance score 260 of secret 130. Features 210 may include, but are not limited to, secret value 212, secret offset 214, secret type 216, file name 218, file path 220, file size 222, file contents 224, and file metadata 226.

Secret value 212 refers to the secret itself. For example, secret value 212 may be a password, a token, a certificate, a private key, or some other data that enables access to a cloud resource.

Secret offset 214 is one or more locations where secret 130 was found in the file 112. For example, secret offset 214 may indicate a number of characters, or a line a column number, or a byte offset, that indicates where secret 130 was encountered in file 112.

Secret type 216 refers to a classification of secret 130. Examples include "username and password", "token", "certificate", "private key", etc. Secret type 216 may be determined by secret scanner 120, and in particular by matching a secret to a particular regular expression 122. In some configurations, feature preprocessing engine 230 uses secret type 216 to select which features 210 are provided to secret prioritization model 250.

Filename 218 refers to the name of file 112, just as file path 220 refers to the path at which file 112 was found in file storage 206. For example, file path 220 may indicate a root drive or network share, in addition to an indication of which branch file 112 was found on in the file tree of file storage 106. Some of these aspects of file path 220 may be omitted when file 112 is obtained from other types of file stores, such as blob stores, relational data stores, etc.

File size 222 refers to the number of bytes of file 112. File contents 224 refers to select pieces of content of file 112 that were extracted by regular expressions 122. For example, file contents of a "password" secret may include a "username" value. File metadata 226 refers to any other type of information associated with file 112, such as file creation time, last modification time, extension, the file creator, or the like.

Feature preprocessing engine 230 normalizes, standardizes, and/or encodes secret features 210 in preparation for secret prioritization model 250. For example, feature preprocessing engine 230 may represent one or more of features 210 with an embedding, a multi-dimensional vector in a vector space used by model 250. Feature preprocessing engine 230 may also normalize features such as file path 220 to use a standard delimiter, such as forward-slashes or file size 222 to represent a number of bytes.

Feature preprocessing engine 230 may also omit, combine, or re-arrange features 210 based on an analysis of features 210. For example, feature pre-processing engine 230 may include or omit features 210 based on what secret type is encoded in secret type 216. For example, if secret type 216 indicates a "private key", feature preprocessing engine 230 may omit features that refer to a username.

In some configurations, secret prioritization model 250 receives features 210 after having been selectively modified, normalized, and encoded by feature preprocessing engine 230. Secret prioritization model 250 may be a multivariate collaborative filtering model trained on secrets found in files of various users. Secret prioritization model 250 may be trained with a set of features and a training relevance score 240 that indicates whether the features 210 are associated with a secret that needs protection or whether the features are associated with a benign secret.

In some configurations, secret prioritization model 250 is a large language model, a foundation model, or other machine learning model that applies general knowledge with an understanding of secrets found in file storage 106. Secret prioritization model 250 may be asked to provide an explanation 270 why a particular secret 130 received a particular relevance score 260. Relevance explanation 270 may use plain language to describe that, for example, secret 130 is part of source code that is external software, and as such does not constitute a security concern. Relevance explanation 270 may indicate that features such as secret type 216, secret value 212, file path 220, file size 222, and offset 214 were the same across user accounts, and as such are unlikely to pose a security threat.

Figure 3:
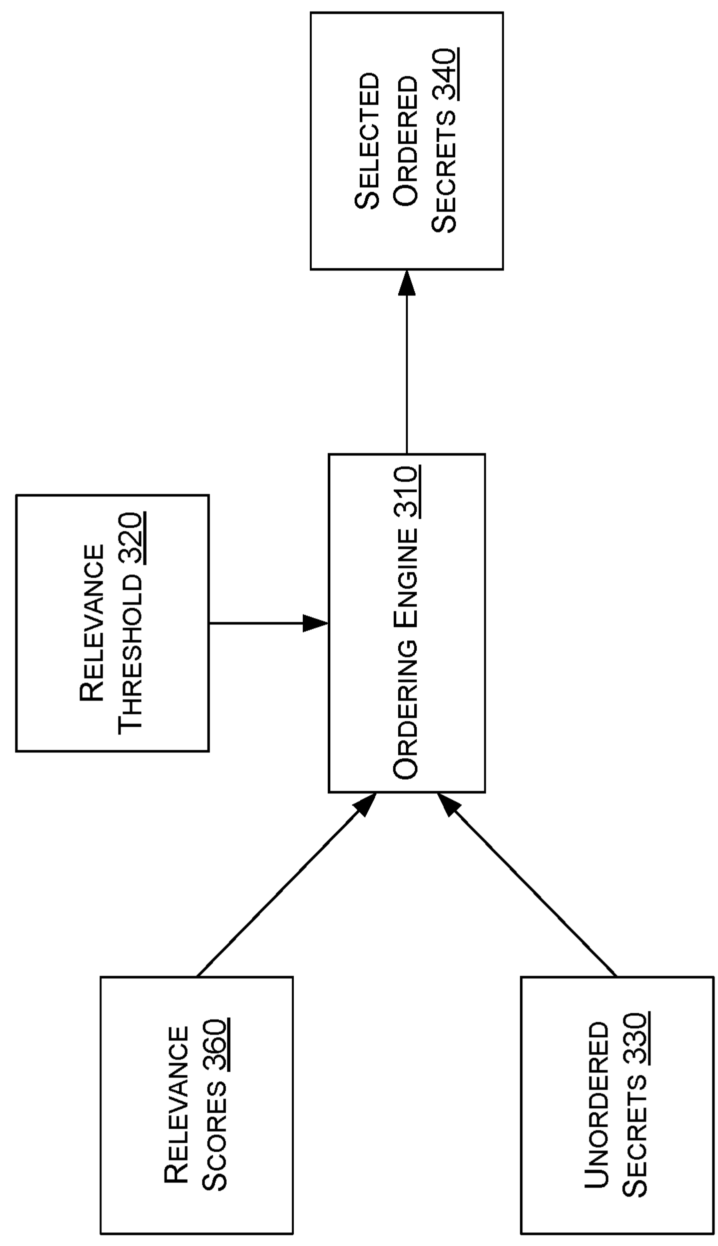
FIG. 3 illustrates filtering and prioritizing secrets to create a list of ordered, selected secrets based on relevance scores.

FIG. 3 illustrates filtering and prioritizing secrets to create a list of ordered secrets based on relevance scores. Relevance scores 360, representing the relevance scores 260 of multiple secrets 130, are provided to ordering engine 310 along with a corresponding list of unordered secrets 330. Ordering engine 310 may apply relevance threshold 320 to filter out unordered secrets 330 with relevance scores beneath threshold 320. Relevance threshold 320 may be a numeric value that is manually calibrated to control the number of secrets identified as potential risks based on the output of secret prioritization model 250. In some configurations, relevance threshold 320 may be adjusted by an end user, increasing or decreasing the number or the percentage of secrets that are presented to the user for further consideration. In some configurations, the resulting selected secrets may be ordered, yielding ordered secrets 340.

Ordered secrets 340 may be presented to a user for further investigation, such as on a website used to scan cloud infrastructure for secrets. Ordered secrets 340 may be color-coded to distinguish high risk secrets from low-risk secrets. Ordered secrets 340 may also be presented in conjunction with tips on remediation, or with a user-activatable option to automatically remediate the security risk. For example, one of ordered secrets 340 may offer to encrypt a file containing a secret, store the secret in a purpose-built secret store, etc. Ordering engine 310 may use a machine learning model to generate human readable or machine executable instructions for remediating a secret.

Figure 4:
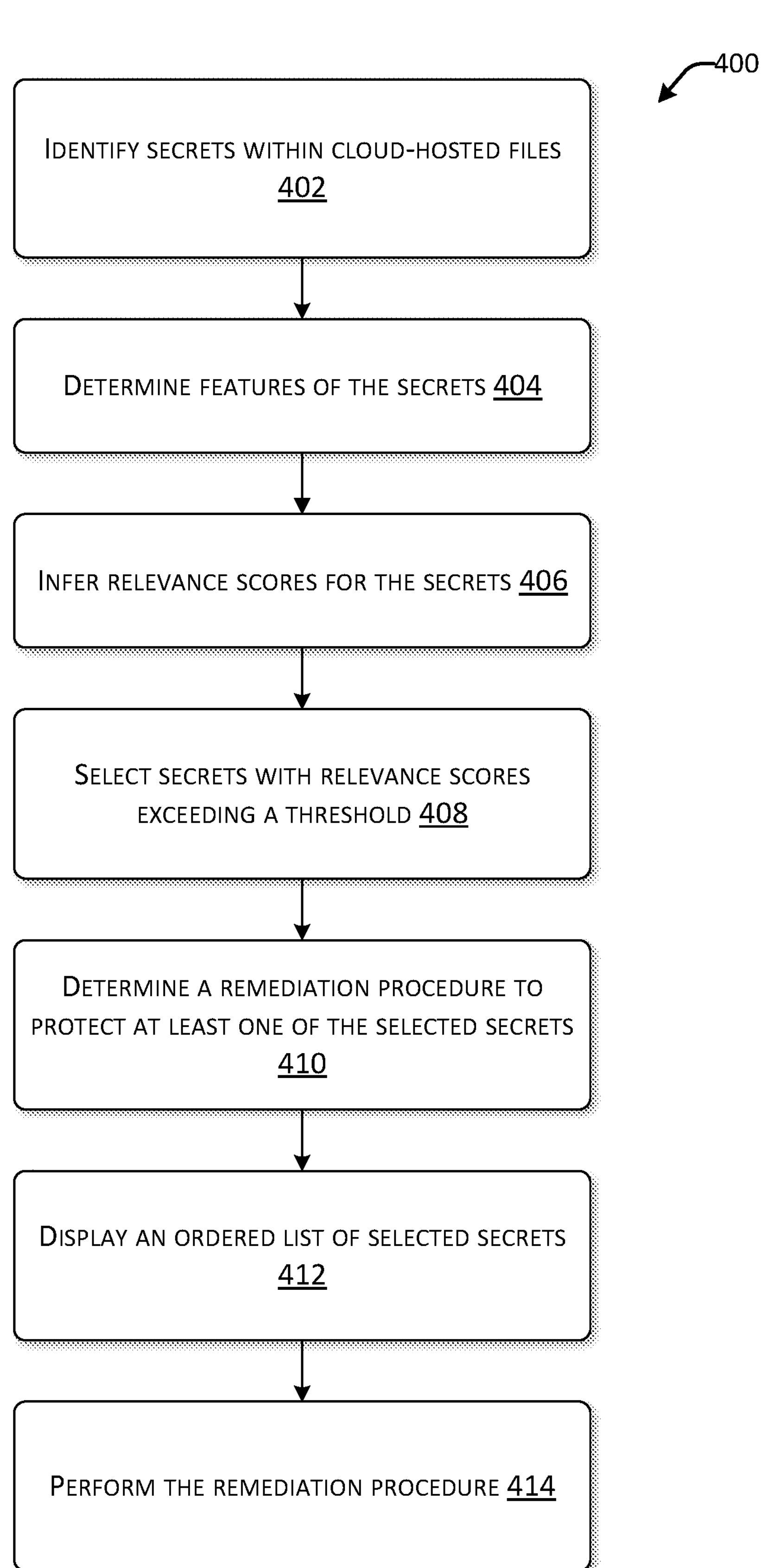
FIG. 4 is a flow diagram of an example method for smart result filtration for secret scanning.

FIG. 4 is a flow diagram of an example method for smart result filtration for secret scanning. Routine 400 begins at operation 402, where as discussed above in conjunction with FIG. 1, secrets 130 are identified within cloud-hosted files 112.

Routine 400 continues at operation 404, where, as discussed above in conjunction with FIGS. 1 and 2, features 210 of secrets 130 are.determined.

Routine 400 continues at operation 406, where feature pre-processing engine 230 normalizes and creates embeddings for features 210 before using secret prioritization model 250 to infer relevance score 260.

Routine 400 continues at operation 408, secrets 130 with relevance scores 260 that exceed a threshold 320 are selected.

Routine 400 continues at operation 410, where a remediation procedure that protects at least one of the selected secrets 340 is determined Routine 400 continues at operation 412, an ordered list of selected secrets 340 is displayed.

Routine 400 continues at operation 414, where a remediation procedure to secure at least one of selected secrets 340 is performed.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routines 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 5:
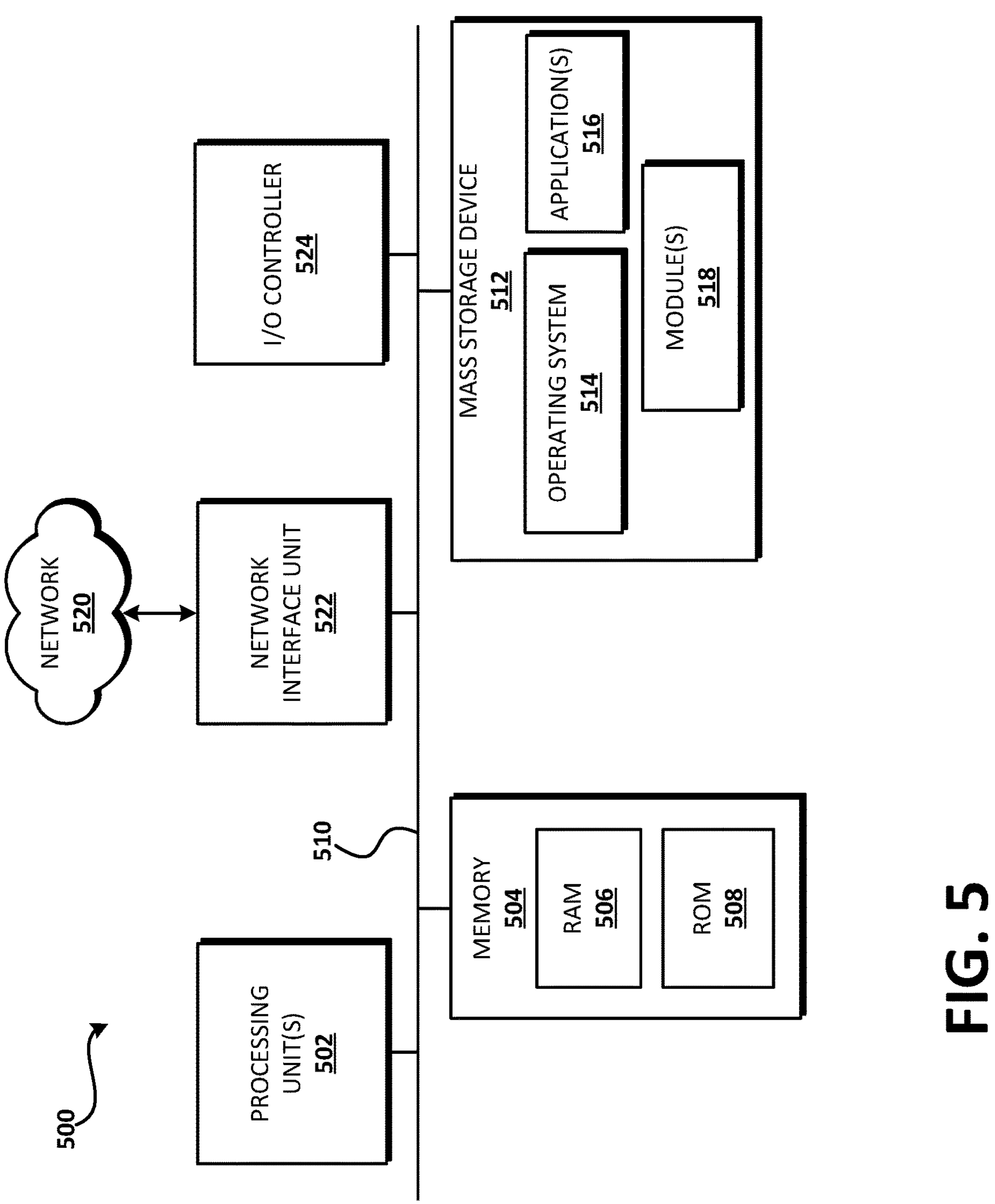
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a device, such as a computer or a server configured as part of the systems described herein, capable of executing computer instructions (e.g., a module or a program component described herein). The computer architecture 500 illustrated in FIG. 5 includes processing unit(s) 502, a system memory 504, including a random-access memory 506 ("RAM") and a read-only memory ("ROM") 508, and a system bus 510 that couples the memory 504 to the processing unit(s) 502.

Processing unit(s), such as processing unit(s) 502, can represent, for example, a CPU-type processing unit, a GPUtype processing unit, a neural processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), Neural Processing Unites (NPUs) etc.

A basic input/output system containing the basic routines that help to transfer information between elements within the computer architecture 500, such as during startup, is stored in the ROM 508. The computer architecture 500 further includes a mass storage device 512 for storing an operating system 514, application(s) 516, modules 518, and other data described herein.

The mass storage device 512 is connected to processing unit(s) 502 through a mass storage controller connected to the bus 510. The mass storage device 512 and its associated computer-readable media provide non-volatile storage for the computer architecture 500. Although the description of computer-readable media contained herein refers to a mass storage device, it should be appreciated by those skilled in the art that computer-readable media can be any available computer-readable storage media or communication media that can be accessed by the computer architecture 500.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 500 may operate in a networked environment using logical connections to remote computers through the network 520. The computer architecture 500 may connect to the network 520 through a network interface unit 522 connected to the bus 510. The computer architecture 500 also may include an input/output controller 524 for receiving and processing input from a number of other devices, including a keyboard, mouse, touch, or electronic stylus or pen. Similarly, the input/output controller 524 may provide output to a display screen, a printer, or other type of output device.

It should be appreciated that the software components described herein may, when loaded into the processing unit(s) 502 and executed, transform the processing unit(s) 502 and the overall computer architecture 500 from a general-purpose computing system into a special-purpose computing system customized to facilitate the functionality presented herein. The processing unit(s) 502 may be constructed from any number of transistors or other discrete circuit elements, which may individually or collectively assume any number of states. More specifically, the processing unit(s) 502 may operate as a finite-state machine, in response to executable instructions contained within the software modules disclosed herein. These computer-executable instructions may transform the processing unit(s) 502 by specifying how the processing unit(s) 502 transition between states, thereby transforming the transistors or other discrete hardware elements constituting the processing unit(s) 502.

The present disclosure is supplemented by the following example clauses:

Example 1: A method comprising: identifying a plurality of secrets in a plurality of files; determining features associated with the plurality of secrets; inferring, with a machine learning model, a plurality of relevance scores of the plurality of secrets based on the features; selecting, from the plurality of secrets, a plurality of selected secrets that exceed a relevance threshold; and causing at least one of the plurality of selected secrets to be displayed.

Example 2: The method of example 1, further comprising: ordering the plurality of selected secrets in descending order of relevance score.

Example 3: The method of example 1, further comprising: obtaining, from the machine learning model, an explanation of a relevance score of one of the plurality of secrets; and causing the explanation of the relevance score to be displayed.

Example 4: The method of example 1, wherein the file is stored on a cloud storage device or a relational database table.

Example 5: The method of example 1, wherein a regular expression is applied to the plurality of files to identify the plurality of secrets.

Example 6: The method of example 1, wherein the plurality of secrets comprises passwords, private keys, security tokens, certificates, or connection strings.

Example 7: The method of example 1, further comprising: identifying a cloud resource that one of the plurality of selected secrets enables access to; and causing an indication of the cloud resource to be displayed.

Example 8: A system comprising: a processing unit; and a computer-readable storage medium having computer-executable instructions stored thereupon, which, when executed by the processing unit, cause the processing unit to: identify a plurality of secrets in a plurality of files; determine features of the plurality of secrets; infer, with a machine learning model, a plurality of relevance scores of the plurality of secrets based on the features; select, from the plurality of secrets, a plurality of selected secrets that exceed a relevance threshold; infer, with the machine learning model, a remediation procedure that protects at least one of the plurality of selected secrets; and cause the at least one of the plurality of selected secrets and an indication of the remediation procedure to be displayed.

Example 9: The system of example 8, wherein the computer-executable instructions further cause the processing unit to: perform the remediation procedure.

Example 10: The system of example 8, wherein the plurality of files include source code files, configuration files, text files, or documents.

Example 11: The system of example 8, wherein the plurality of files are associated with a user account, and wherein the machine learning model uses collaborative filtering to generate a relevance score of the plurality of relevance scores based on how often one of the plurality of secrets is found in other user accounts.

Example 12: The system of example 11, wherein the relevance score is based on how often the one of the plurality of secrets is found in a file with a same path in the other user accounts.

Example 13: The system of example 8, wherein the computer-executable instructions further cause the processing unit to: determine a secret type of one of the plurality of secrets; and select features to provide to the machine learning model for the one of the plurality of secrets based on the secret type.

Example 14: The system of example 8, features for one of the plurality of secrets are obtained from a file of the plurality of files that the one of the plurality of secrets was found in.

Example 15: A computer-readable storage medium having encoded thereon computer-readable instructions that when executed by a processing unit causes a system to: identify a plurality of secrets in a plurality of files; determine features of the plurality of secrets; infer, with a machine learning model, a plurality of relevance scores of the plurality of secrets based on the features; select, from the plurality of secrets, a plurality of selected secrets that exceed a relevance threshold; and cause at least one of the plurality of selected secrets to be displayed.

Example 16: The computer-readable storage medium of example 15, wherein one of the features of includes text proximate to the one of the plurality of secrets.

Example 17: The computer-readable storage medium of example 16, wherein the text comprises a username or an account identifier proximate to the one of the plurality of secrets.

Example 18: The computer-readable storage medium of example 15, wherein the machine learning model is refined with training data comprising features of a secret and a training relevance score.

Example 19: The computer-readable storage medium of example 15, wherein determining a feature of one of the plurality of secrets comprises extracting the feature from the one of the plurality of secrets.

Example 20: The computer-readable storage medium of example 15, wherein the features comprise an offset of an individual secret within an individual file, a secret type, a file name, a file path, a file size, or a file contents.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to “first,” “second,” etc. elements within the Summary and/or Detailed Description is not intended to and should not be construed to necessarily correspond to any reference of “first,” “second,” etc. elements of the claims. Rather, any use of “first” and “second” within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:

identifying a plurality of secrets in a plurality of files, wherein the plurality of secrets comprises a plurality of instances of text and associated metadata;

determining a plurality of features of the plurality of secrets based on the associated metadata other than the plurality of instances of text and other than patterns used to identify the plurality of instances of text;

inferring, with a machine learning model, a plurality of relevance scores of the plurality of secrets based on the plurality of features;

removing, from the plurality of secrets, secrets with relevance scores that are less than a relevance threshold; and causing at least one of the plurality of remaining secrets to be displayed.

2. The method of claim 1, further comprising:

ordering the plurality of selected secrets in descending order of relevance score.

3. The method of claim 1, further comprising:

obtaining, from the machine learning model, an explanation of a relevance score of one of the plurality of secrets; and causing the explanation of the relevance score to be displayed.

4. The method of claim 1, wherein the plurality of files are stored on a cloud storage device or a relational database table.

5. The method of claim 1, wherein a regular expression is applied to the plurality of files to identify the plurality of secrets.

6. The method of claim 1, wherein the plurality of secrets comprises passwords, private keys, security tokens, certificates, or connection strings.

7. The method of claim 1, further comprising:

identifying a cloud resource that one of the plurality of selected secrets enables access to; and causing an indication of the cloud resource to be displayed.

8. A system comprising:

a processing unit; and a computer-readable storage medium having computer-executable instructions stored thereupon, which, when executed by the processing unit, cause the processing unit to:

identify a plurality of secrets in a plurality of files, wherein the plurality of secrets comprises a plurality of instances of text and associated metadata;

determine a plurality of features of the plurality of secrets based on the associated metadata other than the plurality of instances of text and other than patterns used to identify the plurality of instances of text;

infer, with a machine learning model, a plurality of relevance scores of the plurality of secrets based on the plurality of features;

remove, from the plurality of secrets, secrets with relevance scores that are less than a relevance threshold;

infer, with the machine learning model, a remediation procedure that protects at least one of the plurality of selected secrets; and cause the at least one of the plurality of remaining secrets and an indication of the remediation procedure to be displayed.

9. The system of claim 8, wherein the computer-executable instructions further cause the processing unit to:

perform the remediation procedure.

10. The system of claim 8, wherein the plurality of files include source code files, configuration files, text files, or documents.

11. The system of claim 8, wherein the plurality of files are associated with a user account, and wherein the machine learning model uses collaborative filtering to generate a relevance score of the plurality of relevance scores based on how often one of the plurality of secrets is found in other user accounts.

12. The system of claim 11, wherein the relevance score is based on how often the one of the plurality of secrets is found in a file with a same path in the other user accounts.

13. The system of claim 8, wherein the computer-executable instructions further cause the processing unit to:

determine a secret type of one of the plurality of secrets; and select features to provide to the machine learning model for the one of the plurality of secrets based on the secret type.

14. The system of claim 8, wherein features for the one of the plurality of secrets are obtained from a file of the plurality of files that the one of the plurality of secrets was found in.

15. A computer-readable storage medium having encoded thereon non-transitory computer-readable instructions that when executed by a processing unit causes a system to:

identify a plurality of secrets in a plurality of files, wherein the plurality of secrets comprises a plurality of instances of text and associated metadata;

determine a plurality of features of the plurality of secrets based on the associated metadata other than the plurality of instances of text and other than patterns used to identify the plurality of instances of text;

infer, with a machine learning model, a plurality of relevance scores of the plurality of secrets based on the plurality of features;

removing, from the plurality of secrets, secrets with relevance scores that are less than a relevance threshold; and cause at least one of the plurality of remaining secrets to be displayed.

16. The non-transitory computer-readable storage medium of claim 15, wherein one of the plurality of features of includes text proximate to the one of the plurality of secrets.

17. The non-transitory computer-readable storage medium of claim 16, wherein the text comprises a username or an account identifier proximate to the one of the plurality of secrets.

18. The non-transitory computer-readable storage medium of claim 15, wherein the machine learning model is refined with training data comprising features of a secret and a training relevance score.

19. The non-transitory computer-readable storage medium of claim 15, wherein determining a feature of one of the plurality of secrets comprises extracting the feature from the one of the plurality of secrets.

20. The non-transitory computer-readable storage medium of claim 15, wherein the plurality of features comprise an offset of an individual secret within an individual file, a secret type, a file name, a file path, a file size, or a file contents.

* * * * *